(No Model.) 2 Sheets—Sheet 1.
G. PENDLETON, Jr.
BOBBIN.
No. 542,835. Patented July 16, 1895.
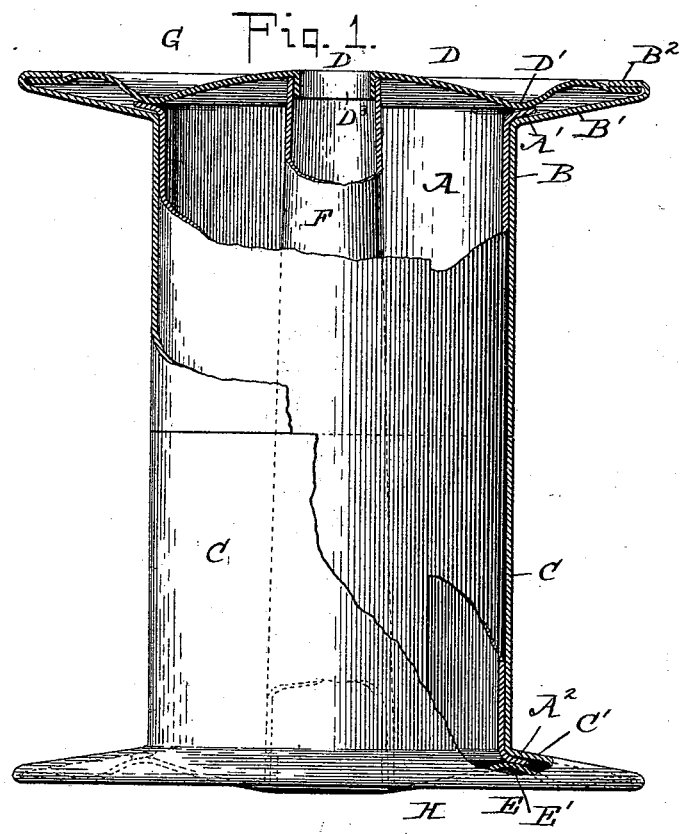
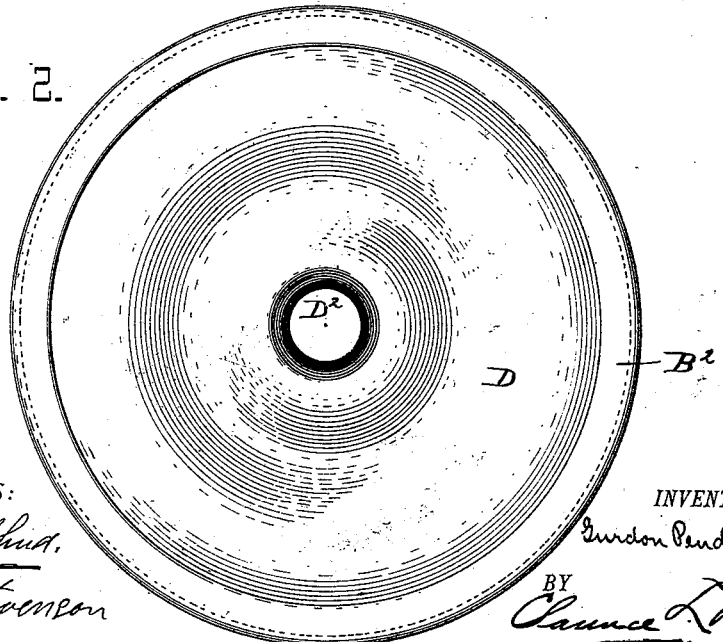
WITNESSES:
B. B. Shepherd.
H. M. Stevenson.
INVENTOR
Gurdon Pendleton Jr
BY
Clarence L. Berger
ATTORNEY (No Model.) 2 Sheets—Sheet 2.

G. PENDLETON, Jr.
BOBBIN.

No. 542,835. Patented July 16, 1895.

WITNESSES:
R. B. Shepherd.
N. M. Stevenson

Gurdon Pendleton Jr.
INVENTOR

BY Clarence L. Burger
ATTORNEY

UNITED STATES PATENT OFFICE.

GURDON PENDLETON, JR., OF NEW YORK, N. Y., ASSIGNOR, BY DIRECT AND MESNE ASSIGNMENTS, TO THE PENDLETON MANUFACTURING COMPANY.

BOBBIN.

SPECIFICATION forming part of Letters Patent No. 542,835, dated July 16, 1895.

Application filed January 6, 1894. Serial No. 495,921. (No model.)

*To all whom it may concern:*

Be it known that I, GURDON PENDLETON, Jr., a citizen of the United States, residing in the city, county, and State of New York, have invented a certain new and useful Improvement in Bobbins, of which the following is a specification.

The object of my invention is to furnish a weatherproof all-metallic bobbin for spinning, and also as a take-up bobbin, which will be lighter, stronger, more rigid, more durable, and more perfectly balanced than the bobbins heretofore designed.

The invention comprises various novel features in the construction of a bobbin entirely of thin or sheet metal, as will hereinafter be described in detail and then pointed out in the claims.

Reference is to be had to the accompanying drawings, forming part of this specification, in which—

Figure 1 is a side partly-sectional view illustrating the construction of a spinning-bobbin in accordance with my invention. Fig. 2 is an end view of the said bobbin. Figs. 3 to 10 illustrate on a reduced scale the various steps in the manufacture of the spinning-bobbin.

Corresponding parts are designated by similar letters of reference in the various figures.

Figure 3:
Figure 4:
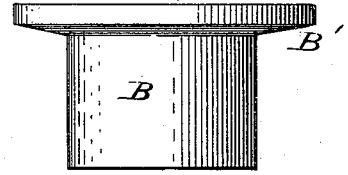
Figure 9:
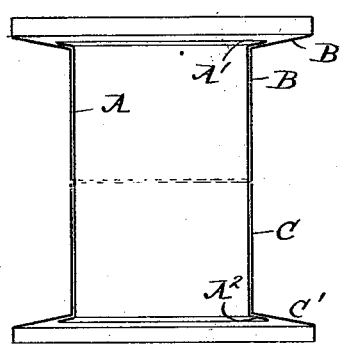
Figure 5:
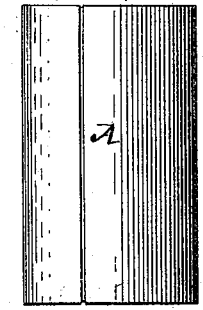
Figure 10:
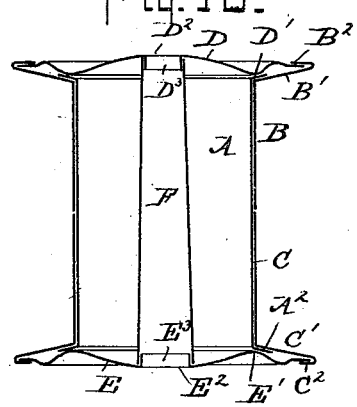
Figure 6:
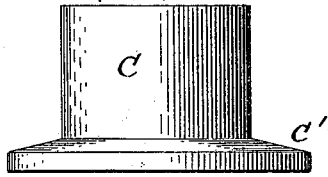
Figure 7:
Figure 8:

In constructing the spinning-bobbin represented herein I form a cylindrical shell A, preferably of flat sheet metal, as shown in detail in Fig. 5. I also form, usually by drawing out of metal, two sleeves B C, with annular head-plates B' C' on their opposite ends, as shown in Figs. 6 and 8, to slip and fit snugly over the shell A, so that their inner ends meet and the outer ends A' A² of the shell project somewhat beyond their outer ends. I then bend said projecting outer ends A' A² of the shell A in a die outward over and upon the respective head-plates B' C', as best shown in Fig. 9, so as to bind the sleeves B C together, which sleeves at the same time closely bind and stiffen the shell A. I also press out of sheet metal two outer head-plates D E, (shown in Figs. 3 and 7,) of somewhat less diameter than the sleeve head-plates B' C', and having inward projecting annular corrugations D' E' and central apertures D² E², the metal around which is pressed inward to form tubular hubs D³ E³, the hub E³ being of a larger diameter than the hub D³, for the purpose hereinafter set forth. I further form a metal tube F, (shown in Fig. 8,) tapering to fit the spinning-spindle, the hubs D³ E³ being made to fit snugly within the respective ends of said tube. I then place the outer head-plate D concentrically upon the sleeve head-plate B', so that its inward corrugation D' will bear upon the bent end A' of the shell A and bind the same in place, and then bend the edge B² of the inner head-plate B' inward over and upon the outer head-plate D, as shown in Figs. 1, 2, and 10, thereby forming one head G of the bobbin, which being double, hollow, and corrugated will possess the necessary stiffness and strength while being extremely light. I then place the small end of the tube F axially within the shell A and around the head-hub D³, and then secure the outer head-plate E upon the other sleeve head-plate C', and its hub E³ within the larger end of the tube F, by bending the edge C² of the head-plate C' inward, over and upon the outer head-plate E, and thereby form the other head H of the bobbin, as described in connection with the head G.

Owing to the described symmetrical method of construction the bobbin will be truly balanced, and thus when spinning be free from vibration, which its lightness further assists to avoid.

I claim—

1. The bobbin constructed of a sheet-metal cylindrical shell, sleeves formed with inner head plates surrounding said shell, the ends of said shell being bent outward upon said inner head plates, and outer head plates, the peripheries of which are secured to those of the inner head plates by a fold, B², and which are provided with central hubs and intermediate annular bearings D' binding the said bent-over ends of the shell upon the inner head-plates, the said shell rigidly connecting the united head plates on both ends near their peripheries and the said hubs serving as the center-bearings of the bobbin.

2. The bobbin herein described formed of a sheet-metal cylindrical shell, two sleeves having annular head-plates on their outer ends, surrounding said shell, the ends of the shell being bent outward over and upon said head-plates, outer head-plates over and upon which the edges of the inner head-plates are bent, and which are provided with inwardly projecting tubular hubs, and an inner axial tube, the respective ends of which surround said hubs, substantially as described.

3. The bobbin constructed of a sheet metal cylindrical shell, sleeves provided with inner head plates, surrounding said shell, the ends of which shell are bent laterally over and upon the inner head plates, and outer head plates fixed to said inner head plates and formed with central hubs, substantially as and for the purpose set forth.

GURDON PENDLETON, Jr.

Witnesses:
H. M. STEVENSON,
J. B. PAIGE.